(12) United States Patent
Russ et al.

(10) Patent No.: US 7,978,720 B2
(45) Date of Patent: Jul. 12, 2011

(54) DIGITAL MEDIA DEVICE HAVING MEDIA CONTENT TRANSFER CAPABILITY

(76) Inventors: Samuel H. Russ, Lawrenceville, GA (US); Christopher L. Stallings, Loganville, GA (US)

( * ) Notice: Subject to any disclaimer, the term of this patent is extended or adjusted under 35 U.S.C. 154(b) by 497 days.

(21) Appl. No.: 11/428,365

(22) Filed: Jun. 30, 2006

(65) Prior Publication Data

US 2008/0002951 A1    Jan. 3, 2008

(51) Int. Cl.
*H04L 12/56*    (2006.01)
(52) U.S. Cl. ........ 370/419; 380/200; 386/200; 710/313; 713/193; 725/86; 725/105; 725/143; 725/151
(58) Field of Classification Search .................. 370/419, 370/401
See application file for complete search history.

(56) References Cited

U.S. PATENT DOCUMENTS

| | | |
|---|---|---|
| 5,742,677 A | 4/1998 | Pinder et al. |
| 5,742,686 A | 4/1998 | Finley |
| 5,796,829 A | 8/1998 | Newby et al. |
| 5,856,975 A | 1/1999 | Rostoker et al. |
| 5,870,474 A | 2/1999 | Wasilewski et al. |
| 5,872,846 A | 2/1999 | Ichikawa |
| 5,905,522 A | 5/1999 | Lawler |
| 5,915,068 A | 6/1999 | Levine |
| 5,917,822 A | 6/1999 | Lyles et al. |
| 5,933,503 A | 8/1999 | Schell et al. |
| 5,940,391 A | 8/1999 | Malkin et al. |
| 5,943,047 A | 8/1999 | Suzuki |
| 5,961,603 A | 10/1999 | Kunkel et al. |
| 5,987,572 A | 11/1999 | Weidner et al. |
| 5,990,881 A | 11/1999 | Inoue et al. |
| 5,990,927 A | 11/1999 | Hendricks et al. |
| 5,999,970 A | 12/1999 | Krisbergh et al. |
| 6,005,938 A | 12/1999 | Banker et al. |

(Continued)

FOREIGN PATENT DOCUMENTS

EP    0 782 296    7/1997

(Continued)

OTHER PUBLICATIONS

"Explorer 8300 Series Digital Recorder" ScientificAtlanta.com [online] Oct. 2005, XP002459851, Retrieved from the internet: URL:http://www.cisco.com/application/pdf/en/us/guest/products/ps8613/c1650/cdccont_0900aecd806c6913.pdf [retrieved on Nov. 22, 2007].

(Continued)

*Primary Examiner* — Ayaz R Sheikh
*Assistant Examiner* — Nicholas Sloms
(74) *Attorney, Agent, or Firm* — Merchant & Gould (57) ABSTRACT

Systems and methods for media content transfer are described. One exemplary embodiment of a method for transferring content from a first digital video recorder (DVR) set-top to a second DVR set-top includes recording instances of media content to a first storage medium located internal to a housing of the first DVR set-top and receiving an indication that the instances of media content stored to the first storage medium are to be made available for playback using the second DVR set-top. One exemplary method further includes, in response to receiving the indication that the instances of media content stored to the first storage medium are to be made available for playback using the second DVR set-top, providing the instances of media content to the second DVR set-top over a communication interface of the second DVR set-top, the communication interface accessible from an external port of the second DVR set-top.

9 Claims, 8 Drawing Sheets

U.S. PATENT DOCUMENTS

| | | |
|---|---|---|
| 6,006,257 A | 12/1999 | Slezak |
| 6,020,982 A | 2/2000 | Yamauchi et al. |
| 6,035,281 A | 3/2000 | Crosskey et al. |
| 6,057,872 A | 5/2000 | Candelore |
| 6,088,455 A | 7/2000 | Logan et al. |
| 6,098,056 A | 8/2000 | Rusnak et al. |
| 6,105,134 A | 8/2000 | Pinder et al. |
| 6,108,002 A | 8/2000 | Ishizaki |
| 6,118,976 A | 9/2000 | Arias et al. |
| 6,157,377 A | 12/2000 | Shah-Nazaroff et al. |
| 6,157,719 A | 12/2000 | Wasilewski et al. |
| 6,173,400 B1 | 1/2001 | Perlman et al. |
| 6,185,625 B1 | 2/2001 | Tso et al. |
| 6,229,895 B1 | 5/2001 | Son et al. |
| 6,230,269 B1 | 5/2001 | Spies et al. |
| 6,246,767 B1 | 6/2001 | Akins, III et al. |
| 6,252,964 B1 | 6/2001 | Wasilewski et al. |
| 6,253,375 B1 | 6/2001 | Gordon et al. |
| 6,292,568 B1 | 9/2001 | Akins, III et al. |
| 6,305,020 B1 | 10/2001 | Hoarty et al. |
| 6,345,307 B1 | 2/2002 | Booth |
| 6,356,971 B1 | 3/2002 | Katz et al. |
| 6,366,987 B1 | 4/2002 | Tzelnic et al. |
| 6,378,130 B1 | 4/2002 | Adams |
| 6,401,243 B1 | 6/2002 | Suzuki |
| 6,424,714 B1 | 7/2002 | Wasilewski et al. |
| 6,424,717 B1 | 7/2002 | Pinder et al. |
| 6,459,427 B1 | 10/2002 | Mao et al. |
| 6,484,318 B1 | 11/2002 | Shioda et al. |
| 6,510,519 B2 | 1/2003 | Wasilewski et al. |
| 6,516,412 B2 | 2/2003 | Wasilewski et al. |
| 6,526,508 B2 | 2/2003 | Akins, III et al. |
| 6,532,593 B1 | 3/2003 | Moroney |
| 6,543,053 B1 | 4/2003 | Li et al. |
| 6,549,577 B2 | 4/2003 | Florencio et al. |
| 6,550,008 B1 | 4/2003 | Zhang et al. |
| 6,560,340 B1 | 5/2003 | Akins, III et al. |
| 6,574,609 B1 | 6/2003 | Downs et al. |
| 6,636,953 B2 | 10/2003 | Yuasa et al. |
| 6,727,944 B1 | 4/2004 | Adachi |
| 6,744,892 B2 | 6/2004 | Akins, III et al. |
| 6,748,080 B2 | 6/2004 | Russ et al. |
| 6,804,357 B1 | 10/2004 | Ikonen et al. |
| 6,937,729 B2 | 8/2005 | Akins, III et al. |
| 6,963,972 B1 | 11/2005 | Chang et al. |
| 6,971,008 B2 | 11/2005 | Wasilewski et al. |
| 7,062,658 B1 | 6/2006 | Cheriton et al. |
| 7,065,216 B1 | 6/2006 | Benaloh et al. |
| 7,089,579 B1 | 8/2006 | Mao et al. |
| 7,107,416 B2 | 9/2006 | Stuart et al. |
| 7,146,388 B2 | 12/2006 | Stakutis et al. |
| 7,155,609 B2 | 12/2006 | Chan et al. |
| 7,181,010 B2 | 2/2007 | Russ et al. |
| 7,200,868 B2 | 4/2007 | Mattox et al. |
| 7,212,725 B2 | 5/2007 | Gunji et al. |
| 7,233,959 B2 | 6/2007 | Kanellos et al. |
| 7,363,326 B2 | 4/2008 | Margolus |
| 7,505,592 B2 | 3/2009 | Russ et al. |
| 7,602,913 B2 | 10/2009 | Wasilewski |
| 7,602,914 B2 | 10/2009 | Wasilewski |
| 7,630,499 B2 | 12/2009 | Wasilewski |
| 7,650,442 B2 | 1/2010 | Ashley et al. |
| 7,860,250 B2 | 12/2010 | Russ et al. |
| 7,861,082 B2 | 12/2010 | Pinder et al. |
| 2001/0006400 A1 | 7/2001 | Kubo et al. |
| 2001/0049824 A1 | 12/2001 | Baker et al. |
| 2002/0013772 A1 | 1/2002 | Peinado |
| 2002/0018130 A1 | 2/2002 | Suemoto et al. |
| 2002/0026582 A1 | 2/2002 | Futamura et al. |
| 2002/0044658 A1 | 4/2002 | Wasilewski et al. |
| 2002/0094084 A1 | 7/2002 | Wasilewski et al. |
| 2002/0099663 A1 | 7/2002 | Yoshino et al. |
| 2002/0116708 A1 | 8/2002 | Morris et al. |
| 2002/0144067 A1 | 10/2002 | Jeong |
| 2002/0146237 A1 | 10/2002 | Safadi |
| 2002/0184457 A1 | 12/2002 | Yuasa et al. |
| 2002/0199190 A1 | 12/2002 | Su |
| 2003/0005446 A1 | 1/2003 | Jaff et al. |
| 2003/0005454 A1 | 1/2003 | Rodriguez et al. |
| 2003/0009668 A1 | 1/2003 | Chan |
| 2003/0028890 A1 | 2/2003 | Swart |
| 2003/0093680 A1 | 5/2003 | Astley et al. |
| 2003/0110234 A1 | 6/2003 | Egli et al. |
| 2003/0161617 A1* | 8/2003 | Um et al. ...................... 386/121 |
| 2003/0188164 A1 | 10/2003 | Okimoto et al. |
| 2003/0200337 A1 | 10/2003 | Jabri et al. |
| 2004/0039911 A1 | 2/2004 | Oka et al. |
| 2004/0045030 A1 | 3/2004 | Reynolds et al. |
| 2004/0052377 A1 | 3/2004 | Mattox et al. |
| 2004/0068739 A1 | 4/2004 | Russ et al. |
| 2004/0117831 A1 | 6/2004 | Ellis et al. |
| 2004/0128499 A1 | 7/2004 | Peterka et al. |
| 2004/0187014 A1 | 9/2004 | Molaro |
| 2004/0193921 A1 | 9/2004 | Byrne |
| 2004/0236804 A1* | 11/2004 | Bots et al. ...................... 707/204 |
| 2004/0237100 A1 | 11/2004 | Pinder |
| 2005/0076066 A1 | 4/2005 | Stakutis et al. |
| 2005/0080497 A1 | 4/2005 | Rao |
| 2005/0091173 A1 | 4/2005 | Alve |
| 2005/0100162 A1 | 5/2005 | Alve et al. |
| 2005/0102513 A1 | 5/2005 | Alve |
| 2005/0111835 A1* | 5/2005 | Friel et al. ...................... 386/111 |
| 2005/0223414 A1 | 10/2005 | Kenrich et al. |
| 2005/0232593 A1 | 10/2005 | Kanai |
| 2005/0237396 A1 | 10/2005 | Hagiwara et al. |
| 2005/0240708 A1* | 10/2005 | Shaver et al. .................. 710/313 |
| 2006/0013566 A1 | 1/2006 | Nakamura |
| 2006/0020786 A1 | 1/2006 | Helms et al. |
| 2006/0039256 A1 | 2/2006 | Nakamura et al. |
| 2006/0039559 A1 | 2/2006 | Wasilewski |
| 2006/0039560 A1 | 2/2006 | Wasilewski |
| 2006/0041905 A1 | 2/2006 | Wasilewski |
| 2006/0072752 A1 | 4/2006 | Nakano et al. |
| 2006/0074807 A1 | 4/2006 | Gauba et al. |
| 2006/0109854 A1* | 5/2006 | Cancel ........................... 370/401 |
| 2006/0156382 A1 | 7/2006 | Motoyama |
| 2006/0179478 A1 | 8/2006 | Han et al. |
| 2006/0184733 A1 | 8/2006 | Yamamoto et al. |
| 2006/0200865 A1 | 9/2006 | Leake et al. |
| 2007/0055390 A1 | 3/2007 | Simon et al. |
| 2007/0130254 A1 | 6/2007 | Russ et al. |
| 2007/0277205 A1 | 11/2007 | Grannan |
| 2009/0089369 A1 | 4/2009 | Russ et al. |

FOREIGN PATENT DOCUMENTS

| | | |
|---|---|---|
| EP | 1 014 715 | 6/2000 |
| EP | 1 213 919 | 12/2002 |
| FR | 2 779 599 | 12/1999 |
| GB | 2 403 586 A | 1/2005 |
| KR | 10-2003-0037098 | 5/2003 |
| KR | 10-2004-0062662 | 7/2004 |
| WO | WO 00/11840 | 3/2000 |
| WO | WO 00/51041 | 8/2000 |
| WO | WO 01/18807 | 3/2001 |
| WO | WO 01/75876 | 10/2001 |
| WO | WO 01/82588 | 11/2001 |
| WO | WO 02/097997 | 12/2002 |
| WO | WO 2004/098190 | 11/2004 |
| WO | WO 2005/029843 | 3/2005 |
| WO | WO 2005/029852 | 3/2005 |
| WO | WO 2005/091626 | 9/2005 |
| WO | WO 2005/101411 | 10/2005 |
| WO | WO 2006/038204 | 4/2006 |
| WO | 2006066052 A2 | 6/2006 |
| WO | WO 2008/005699 | 1/2008 |
| WO | WO 2008/005700 | 1/2008 |

OTHER PUBLICATIONS

Gilo: "Do It Yourself Making an External Hard Drive Guide" Notebookreview.com, [online], Jun. 2, 2006, XP002459852, Retrieved from the internet: URL:http://www.notebookreview.com/default.asp?newsID=2972 [retrieved on Nov. 22, 2007].

U.S. Appl. No. 10/873,805, filed Jun. 22, 2004, Entitled "Validating Client Receivers," Inventors: Pinder et al.

U.S. Appl. No. 10/920,926, filed Aug. 18, 2004, Entitled "Retrieval and Transfer of Encrypted Hard Drive Content from Digital Video Receiver Set Top Box," Inventor: Wasilewski, Anthony.

U.S. Appl. No. 10/920,841, filed Aug. 18, 2004, Entitled "Retrieval and Transfer of Encrypted Hard Drive content from Digital Video Receiver Set Top Box Utilizing Second Digital Video Receiver Set Top Box," Inventor: Wasilewski, Anthony.

U.S. Appl. No. 10/920,842, filed Aug. 18, 2004, Entitled "Utilization of Encrypted Hard Drive Content by One Digital Video Receiver Set Top Box when Recorded by Another," Inventor: Wasilewski, Anthony.

U.S. Appl. No. 11/405,205, filed Apr. 17, 2006, Entitled "System and Method for Prioritizing the Storage Location of Media Data," Inventors: Prus et al.

U.S. Appl. No. 11/428,367, filed Jun. 30, 2006, Entitled "Secure Escrow and Recovery of Media Device Content Keys," Inventors: Schlarb et al.

U.S. Appl. No. 11/454,421, filed Jun. 16, 2006, Entitled "Securing Media Content Using Interchangeable Encryption Key," Inventors: Pinder et al.

U.S. Appl. No. 11/428,362, filed Jun. 30, 2006, Entitled "System and Method for Managing Media Data," Inventors: Prus et al.

U.S. Appl. No. 11/428,356, filed Jun. 30, 2006, Entitled "System and Method for Applying Retention Rules," Inventors: Prus et al.

U.S. Appl. No. 11/428,357, filed Jun. 30, 2006, Entitled "Digital Media Device having Selectable Media Content Storage Locations," Inventors: Prus et al.

U.S. Appl. No. 11/671,506, filed Feb. 6, 2007, Entitled "Apparatus for Entitling and Transmitting Service Instances to Remote Client Devices," Inventors: Russ et al.

U.S. Appl. No. 11/942,778, filed Nov. 20, 2007, Entitled "Retrieval and Transfer of Encrypted Hard Drive Content from Digital Video Receiver Set Top Box to a Content Transcription Device," Inventor: Wasilewski, Anthony.

International Search Report and Written Opinion dated Mar. 3, 2008 cited in PCT/US2007/071841.

Allway Sync (Allway Sync 3.2.2), Dec. 6, 2005, pp. 1-14.

Barton "TiVO—Lution: The Challenges of delivery a reliable, easy-to-use DVR service to the masses" ACM QUEUE Apr. 2006 35 more queue: www.acmqueue.com.

Blackcurrant, ("Delete Files Across a Network"), May 11, 2005; accessed Jul. 2, 2010 at http://techrepublic.com.com/5208-6230-0. html?forumID=3&threadID=173478&start=0; 3 pgs.

Boston College, "Copying Files to a USB Drive or External Hard Drive," Nov. 8, 2005, pp. 1-5 http://web.archive.org/web/20060227003853/http://www.bc.edu/offices/help/met-elements/doc/articles/html/HW-usb-drive-copy.shtml.

Chorianopoulous et al. "Affective Usability Evaluation for an Interactive Music Television Channel" ACM Computers in Entertainment, vol. 2, No. 3, Jul. 2004, Article 7b.

Dybwad, B.; ("TiVo 7.2 OS Adds Red Flag Content Protection Feature"), Sep. 14, 2005, pp. 1-5, http://www.engadget.com/2005/09/14/tivo-7-2-os-adds-red-flag-content-protection-feature/.

Ellison, "TiVo Series 2", Jan. 13, 2004, pp. 1-6, http://www.pcmag.com/article2/8,2817,1649659,00.asp.

Eskicioglu et al. "An overview of multimedia content protection in consumer electronics devices," Signal Processing. Image Communication, Elsevier Science Publishers, Ambsterdam, NL, vol. 16, No. 7, Apr. 2001, pp. 681-699, XP004232133 ISSN: 0923-5965.

Haughey, M.; ("PC to TiVo Playback Released"), Oct. 24, 2005, pp. 1-13 http://web.archive.org/web/20051024002825/http://www.pvrblog.com/pvr/2005/08/pc_to_tivo_play.html.

Haughey, M.; ("TiVo 7.2 OS Adds Content Protection, Blocks Transfers, and Auto-Deletes Some Shows"), Sep. 13, 2005, pp. 1-14, http://www.pvrblog.com/pvr/2005/09/tivo_72_os_adds.html.

Menezes, et al.; "Handbook of Applied Cryptography" Handbook of applied Cryptography, CRC Press Series on Discrete Mathematics and Its Applications, Boca Raton, FL CRC Press, 1997, pp. 546, 567-570, XP002356116 ISBN: 0-8493-8523-7.

Old Apps, ("Old Version of WinSCP"), Jan. 13, 2003, pp. 1-3; accessed Jul. 2, 2010 at http://www.oldapps.com/WinSCP.php?old_winscp=2; 3 pgs.

Picker, "The Digital Video Recorder: Unbundling Advertising and Content" Professor of Commercial Law, The University of Chicago Law School, Senior Fellow, The Computation Institute of the University of Chicago and Argonne National Laboratory; Sep. 10, 2003.

Smith, J.; "Files and Folders: Removable Media," Oct. 13, 2004, pp. 1-12 http://web.archive.org/web/20041027194919/http://www.jegsworks.com/Lessons/win/filesandfolders/step-removabledisk.htm.

TiVo.com "What is TiVo?", Jan. 14, 2005, pp. 1-12; http://web.archive.org/web/20050114053806/http://www.tivo.com/1.0.asp.

WinFtp, Sep. 8, 2005, pp. 1-7 http://download.cnet.com/WinFtp-Client/3000-2160_4-10429297.html.

Wurmlin et al. "3D Video Record" Proceedings of the 10th Pacific Conference on Computer Graphics and Applications (PG'02) IEEE Computer Society.

International Search Report dated Oct. 22, 2003 in PCT/US2003/016585.

International Search Report and Written Opinion dated Jun. 7, 2006, cited in PCT/US2005/022069.

International Search Report and Written Opinion dated Dec. 21, 2007, cited in PCT/US2007/071842.

International Search Report cited in PCT/US2007/071843 mailed Dec. 27, 2007.

Supplemental European Search Report dated Jan. 24, 2008, in Application No. 03 755 496.01.

International Search Report dated Jan. 31, 2008, in PCT/US2007/070680.

European Office Action mailed Jul. 24, 2008 in Application No. 03 755 496.1.

International Preliminary Report mailed Jan. 6, 2009, in PCT/US2007/072328.

European Office Action mailed Feb. 10, 2009, in Application No. 07798909.3.

European Office Action mailed Feb. 11, 2009, in Application No. 07798908.5.

European Office Action mailed Feb. 18, 2009, in Application No. 07 798 909.3.

European Office Action mailed Mar. 16, 2009, in Application No. 07 781 952.2.

European Office Action mailed Apr. 29, 2009 in Application No. 07 784 510.5.

European Office Action mailed Apr. 29, 2009 in Application No. 07 798 908.5.

European Office Action mailed May 7, 2009 in Application No. 07 840 308.6.

European Office Action mailed May 11, 2009 in Application No. 05 766 482.3.

European Office Action mailed Jun. 9, 2009 in Application No. 07 815 092.7.

Australian Office Action mailed Aug. 4, 2009 in Application 2005258137.

Canadian Office Action mailed Aug. 19, 2009 in Application 2,571,533.

Notice of Preliminary Rejection dated May 28, 2010, cited in KR Appl. No. 10-2008-7031848, 7 pgs.

European Office Action mailed Sep. 9, 2010 in Application No. 07 840 308.6.

Notice of Preliminary Rejection dated Sep. 18, 2010 cited in Korean Application No. 10-2008-7032127.

Notice of Preliminary Rejection dated Oct. 25, 2010 cited in Korean Application No. 10-2008-7030549.

Notice of Final Rejection dated Nov. 26, 2010 cited in Korean Application No. 10-2008-7031848.

Office Action mailed Aug. 20, 2007, in U.S. Appl. No. 10/873,805.
Office Action mailed Jan. 9, 2008, in U.S. Appl. No. 10/873,805.
Office Action mailed Apr. 30, 2008, in U.S. Appl. No. 11/482,356.
Office Action mailed Jul. 9, 2008, in U.S. Appl. No. 10/873,805.
Office Action mailed Aug. 5, 2008, in U.S. Appl. No. 11/428,357.
Office Action mailed Sep. 30, 2008, in U.S. Appl. No. 11/428,362.
Office Action mailed Nov. 28, 2008, in U.S. Appl. No. 11/482,356.
Office Action mailed Dec. 12, 2008, in U.S. Appl. No. 11/428,365.
Office Action mailed Dec. 17, 2008, in U.S. Appl. No. 10/873,805.
Office Action mailed Mar. 18, 2009, in U.S. Appl. No. 11/428,362.
Office Action mailed Apr. 2, 2009, in U.S. Appl. No. 11/428,357.
Office Action mailed May 28, 2009, in U.S. Appl. No. 11/428,365.

Office Action mailed Jul. 22, 2009, in U.S. Appl. No. 11/428,357.
Office Action mailed Aug. 4, 2009, in U.S. Appl. No. 11/428,356.
Office Action mailed Aug. 7, 2009, in U.S. Appl. No. 11/428,362.
Office Action mailed Sep. 22, 2009, in U.S. Appl. No. 11/454,421.
Office Action mailed Oct. 7, 2009, in U.S. Appl. No. 11/428,367.
Office Action mailed Oct. 26, 2009, in U.S. Appl. No. 11/428,365.
Office Action mailed Oct. 28, 2009, in U.S. Appl. No. 11/942,778.
Office Action mailed Dec. 9, 2009, in U.S. Appl. No. 11/428,357.
Office Action mailed Jan. 14, 2010, in U.S. Appl. No. 11/428,362.
Office Action mailed Feb. 1, 2010, in U.S. Appl. No. 11/428,356.
Office Action mailed Feb. 24, 2010, in U.S. Appl. No. 12/327,157.
Office Action mailed Apr. 1, 2010, in U.S. Appl. No. 11/405,205.
Office Action mailed Apr. 13, 2010, in U.S. Appl. No. 11/454,421.
Office Action mailed Apr. 14, 2010, in U.S. Appl. No. 11/428,367.
Office Action mailed May 11, 2010, in U.S. Appl. No. 11/428,357.
Office Action mailed May 26, 2010, in U.S. Appl. No. 11/428,362.
Office Action mailed Aug. 31, 2010 in U.S. Appl. No. 11/405,205.
Office Action mailed Oct. 26, 2010 in U.S. Appl. No. 11/428,357.
Office Action mailed Nov. 2, 2010 in U.S. Appl. No. 11/428,362.

* cited by examiner

FIG. 14 ns of an exemplary embodiment of the DVR of FIG. 1.
DIGITAL MEDIA DEVICE HAVING MEDIA CONTENT TRANSFER CAPABILITY

BACKGROUND

1. Technical Field

The present disclosure generally relates to digital media devices, and more specifically, to managing media content associated with digital media devices.

2. Description of the Related Art

Digital media recording devices can be used for recording media signals, such as audio and/or video signals, in a digital format. Such devices may also be used for the storage and playback of such signals. Specific examples of such digital media recording devices are a Digital Video Recorder (DVR) and a Personal Video Recorder (PVR).

In general, a DVR may be used to schedule and record future television programs, for buffering live television programs in a time-shift buffer, and/or playback of the digitally recorded media. The incoming media signals may be received, potentially decrypted and/or encoded, and digitally stored on a storage medium. The storage medium is commonly a non-volatile storage device such as a hard disk drive (HDD) (i.e., hard drive), among other acceptable mediums. Such an HDD can write the digital media data on a magnetic surface of the HDD disk platters and read the media data at later times for playback.

From time-to-time, users of a DVR may wish to upgrade or replace their current DVR with a replacement DVR. For example, the replacement DVRs may include new features not supported by the current DVR. However, in some cases, users balk at upgrading the DVR because media content stored to the current DVR is unable to be transferred to the replacement DVR. Thus, many users choose to refrain from upgrading their DVR, losing out on many exciting features in new models. Additionally, producers of DVRs and others who benefit from their sale or rental, potentially lose revenue over the lost sales.

Accordingly, the present disclosure includes a number of potential embodiments for resolving the aforementioned deficiencies of conventional media recording devices.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
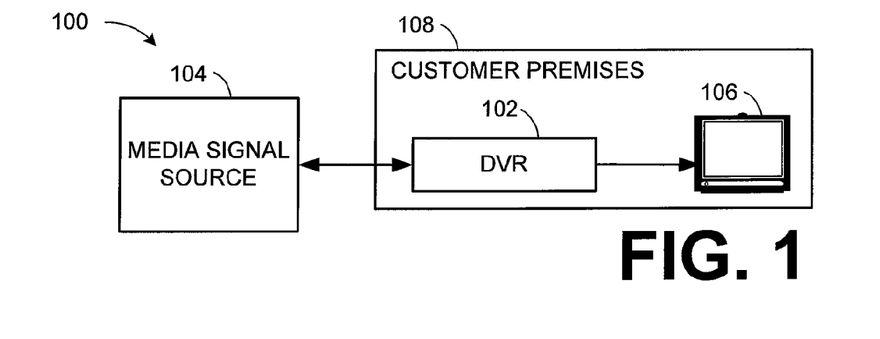
FIG. 1 depicts a block diagram of an exemplary arrangement of a digital video recorder (DVR) in accordance with embodiments of the present disclosure.

FIG. 1 depicts an embodiment of an arrangement 100 of a digital media recording system in accordance with selected embodiments of the present disclosure, among others. According to some embodiments, the digital media recording system includes a digital media device configured to record media content, such as, among others, video and/or audio content. For example, such a digital media device is depicted in FIG. 1 as digital video recorder (DVR) 102. However, according to some embodiments, the digital media device is, among other devices used for recording digital media, a personal video recorder (PVR), a personal digital recorder (PDR), a personal computer, laptop computer, and/or personal digital assistant (PDA), among other electronic devices configured to execute media recording capabilities.

According to some embodiments, DVR 102 is also embedded within, or otherwise associated with, other electronic devices such as a cable television set-top box (STB), a tuner, a television, and/or a satellite-television receiver, or a playback device, such as a television, among others.

Media content is also referred to herein as media programs or media programming. Some examples of media programming used herein include, but are not intended to be limited to, television programs and radio programs. An instance of media programming or media content could be, for example, a recording of a television show (e.g., an episode of Smallville). A series of media programming could be, for example, a number of episodes of a television show (e.g., the last five recordings of Smallville).

The media content is recorded by the digital media recorder and stored as media data. In some instances, such media data is encoded audio and/or video signals, among other representations of the media content that is in a form suitable for processing by DVR 102. Such media signals could be analog and/or digital signals.

DVR 102 is configured to receive media signals from a media signal source 104, and is also in communication with a playback device, such as television 106. According to some embodiments, the playback device is a computer display, portable device, or audio receiver, among other devices capable of emitting or displaying media.

Media signal source 104 is any of a number of sources of analog and/or digital media signals, such as video and/or audio signals. According to some embodiments, media signal source 104 is, for example, among others, a satellite television source, an over-the-air broadcast source, a cable-television (CATV) system, or a server configured to stream, or otherwise provide, media signals over a network (i.e., LAN., WAN, Internet, etc.).

In some instances, media signal source 104 also transmits additional network data, including Internet traffic, teletext, closed-captioning, and/or programming information, among others. Media signal source 104 transmits such signals to DVR 102, which is located in one implementation, among others, remotely at a customer premises 108. Although only one media signal source is depicted, in some embodiments DVR 102 receives media signals from more than one media signal source. For example, in one such embodiment, DVR 102 receives signals from a CATV system as well as an over-the-air antenna.

Television 106 receives and emits signals from DVR 102 that represent the recorded (and unrecorded) media signals. For example, television 106 emits, among others, recorded audio and/or video signals. According to some embodiments, television 106 also displays any windows associated with a graphical user interface generated by DVR 102.

Figure 2:
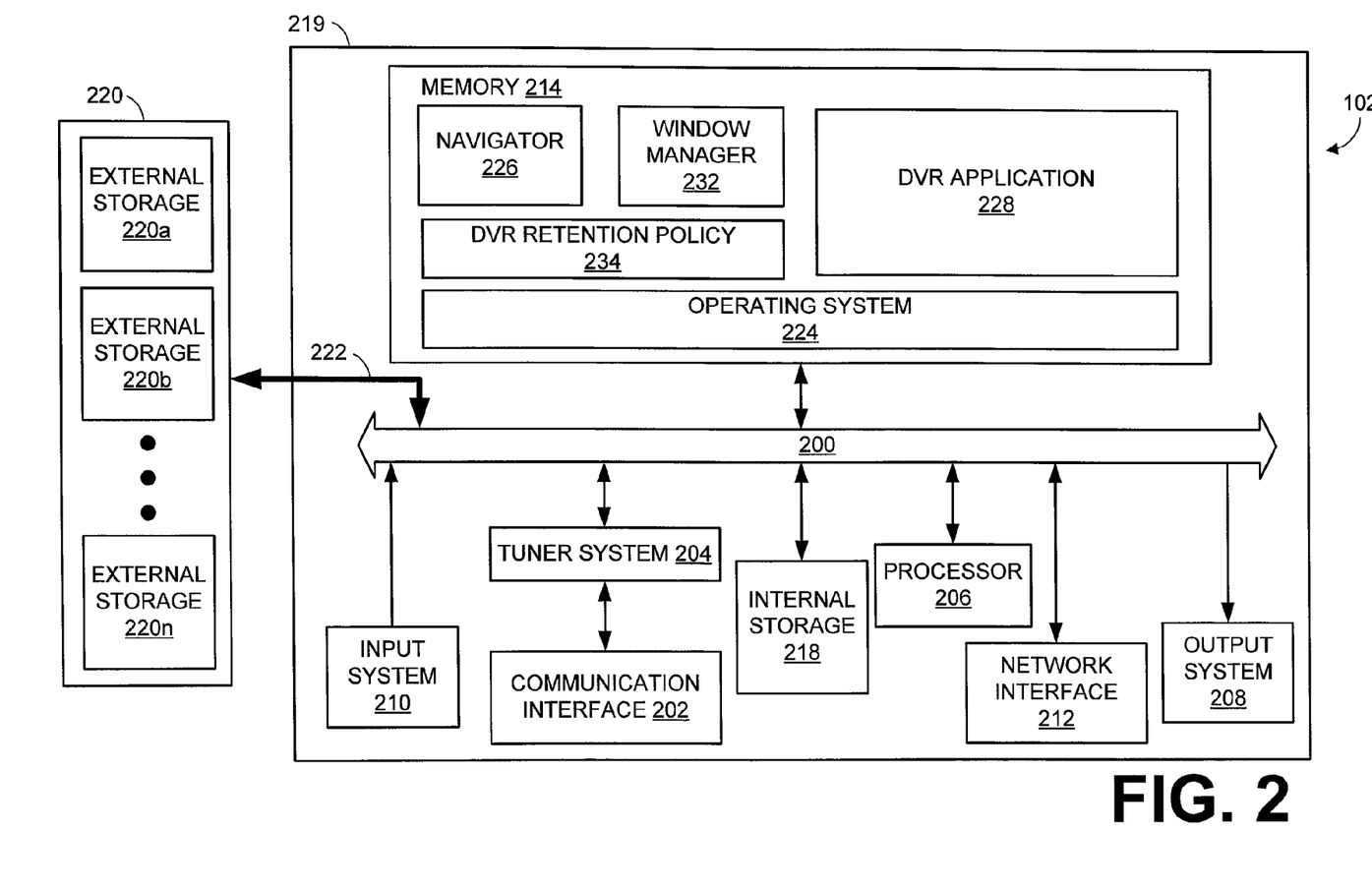
FIG. 2 depicts a block diagram of selected system components of an exemplary embodiment of the DVR of FIG. 1.

FIG. 2 is a block diagram depicting selected system components of an exemplary embodiment of the DVR 102 of FIG. 1. Omitted from FIG. 2 are a number of conventional components, known to those skilled in the art, that are unnecessary to explain the operation of the disclosed systems and methods for applying media retention rules. FIG. 2 depicts several components commonly communicating through a local bus 200. For example, DVR 102 includes a communications interface 202 for receiving video, audio and other media signals and, potentially, programming information from media signal source 104 (FIG. 1). Communications interface 202 comprises, for example, an Ethernet interface, an IEEE-1394 interface, a USB (Universal Serial Bus) interface, a serial interface, a parallel interface, a wireless radio frequency (RF) interface, a telephone line interface, a power-line interface, a coaxial cable interface, and/or an infrared (IR) interface, among others.

DVR 102 also includes a tuner system 204 for receiving and selecting one or more selected channels or streams of media content. For example, according to some instances, tuner system 204 can tune to a particular television channel or stream, and the media signals associated with this channel or stream are recorded by the DVR 102.

DVR 102 further includes at least one processor 206 for controlling the operations of the DVR 102 and an output system 208 for driving a playback device (e.g., television 106). An input system 210 receives user inputs provided via a wired or wireless input device such as, for example, a handheld remote control, a transmitter with buttons or keys located on the exterior of the DVR, and/or a keyboard, among other potential input devices.

Network interface 212 transmits and/or receives data over a network such as a LAN, WAN, or the Internet. For example, data is transferred to/from another DVR, a media signal source, or a centralized server through network interface 212, among others. Memory 214, which can include volatile and/or non-volatile memory, stores one or more programmed software applications, routines, drivers, or other functional elements (herein broadly referred to as applications), which contain instructions that are executed by processor 206 under the direction of operating system 216. Input data used by an application is stored in memory 214 and read by processor 206 as needed during the course of the execution of the application. In some instances, this input data is data stored in memory 214 by a secondary application or other source, either internal or external to DVR 102. In other stances, data is created with the application at the time it was generated as a software application program. According to some embodiments, other logic is stored in memory 212 for operation of the DVR 102.

Internal storage 218 comprises a recordable medium and may be any of a number of devices available for non-volatile data storage, such as, among others, a hard disk drive (HDD), optical drive, or flash memory, for example. Although depicted as separate components, internal storage 218 and memory 214 are the same device in some embodiments. Among other uses, internal storage 218 is used for storing media content (i.e. in the form of media data) received through communication interface 202 and/or network interface 212. In some embodiments, before being stored on the recordable medium, the media content is digitally encoded by the DVR itself or by means external from the DVR, such as the media signal source or a cable set-top box. Media content is stored on the recordable medium in an encrypted or unencrypted state.

According to some embodiments, DVR 102 does not include an external device for storing media content and/or a communication interface for being communicatively coupled to such an external storage device. However, according to some embodiments, DVR 102 includes, or is otherwise configured for attachment to, external storage 220 over a communication interface. Like internal storage 218, external storage 220 also comprises a recordable medium for non-volatile data storage, such as, among others, a hard disk drive (HDD), optical drive, or flash memory, for example. However, unlike internal storage 218, which is located within the DVR enclosure (i.e., housing) 219, external storage 220 can be removably attached to DVR 102 through a communications interface 222. According to some embodiments, external storage 220 is located remotely from the DVR, such as in other rooms or locations within a house.

Although only one external storage medium is used in some embodiments, it is contemplated that other embodiments may comprise a plurality of external storage mediums 220a-220n. In some instances, for example, external storage mediums 220a-220n comprise a plurality of HDDs. It can be appreciated that the one or more HDDs can be combined to communicate with DVR 102 over one or more communication interfaces using a hub or other similar device. According to some embodiments, the external storage 220 is provided in a self-supporting, external housing. Some embodiments also include an integrated power supply for powering to the external storage and/or cooling devices, such as fans and/or heat dissipating devices.

According to some embodiments, communication interface 222 can be a high-speed communication bus, such as, among others, a bus operating under the Advanced Technology Attachment (ATA) standard, and more specifically, the Serial-ATA (i.e., SATA) standard version 2.5, which is available from the Serial ATA International Organization and is hereby incorporated by reference in its entirety. According to such an embodiment, DVR 102 includes a communications interface comprising an attachment port on the housing 219 of the DVR that cooperatively mates with the plug of external storage 220. A cable complying with the high-speed bus (i.e., a cable complying with the SATA standards, for example) provides the transmission medium between external storage 220 and DVR 102. It should be understood that other controllers for moving data across communications interface 222, that are not presently shown in FIG. 2, may be included and associated with DVR 102 and/or external storage 220.

According to some embodiments, the communication interface 222 (and any related controllers and/or other circuitry) is a bus complying with wired infrastructure and protocols, such as, for example, the IEEE 1394 (Firewire) standard or the Universal Serial Bus (USB) standard, among others. However, in some instances, the communication interface 222 is a wireless medium. According to one such a wireless embodiment, the external storage device 220 communicates with DVR 102 using a wireless protocol such as the IEEE 802.11 protocol, among others.

Some embodiments of DVR 102 include a communications interface comprising a slot or port for readily removable media. The readily removable media is, for example, flash memory, an HDD, optical media, and/or magnetic media, among others.

User input received during the course of execution of any processes implemented by DVR 102 are received from an input device (not shown) via input system 210, transmitted through the bus 200, at least temporarily stored within memory 214, and communicated to processor 206. Data generated by an application is stored in memory 214 by processor 206 during the course of the execution of the application. Availability, location, and amount of data generated by one application for consumption by another application is communicated by messages through the services of operating system 224, among others. Hence, preferences for the operation of the DVR functions is input by, among others, a subscriber using a remote and/or remotely under the control of an entity other than the user (e.g., by a command or other configuration change transmitted from the cable head-end). Changes to decision-making logic associated with the applications described herein are made by, among others, a variety of mechanisms under software control.

A navigator application 226 provides a navigation framework for services provided by DVR 102. Navigator 226 registers for, and in some cases reserves, certain user inputs related to navigational keys such as channel increment/decrement, last channel, favorite channel, etc. Navigator 226 also provides users with television (or other programming) related menu options that correspond to DVR functions such as, for example, providing an interactive program guide, blocking a channel or a group of channels from being displayed in a channel menu, recording particular channels, playback of recorded shows, etc.

Under user instruction, DVR application 228 performs the general tasks of recording and/or playing back received media content. Among other functions, DVR application 228 manages media content and related information. For example, according to some embodiments, DVR application 228 determines when and to which device the media content and related information will be stored to respective available storage devices. As well, as communication with storage devices is established or broken (e.g., by, among other possibilities, attaching and detaching external storage devices to the DVR), DVR application 228 performs a number of tasks to ensure that respective information associated with media content stored to the storage devices is managed accordingly. These aspects of DVR application 228, and others, will be described in more detail below.

Applications, such as navigator 226 and DVR application 228, among others, utilize services provided by window manager 232 and/or other graphics utilities provided by operating system 224 to draw dialog boxes, menus, graphics, etc., for display on playback device 106. Window manager 232, which in one embodiment is part of operating system 224, contains functionality for allocating screen areas and managing screen use among the various applications. Accordingly, window manager 232 provides the user interface for the DVR.

The applications executed by DVR 102 comprise executable instructions for implementing logical functions. In some instances, the applications are embodied in any computer-readable medium for use by, or in connection with, an instruction execution system. Some embodiments of the instruction execution system are, for example, a computer-based system, a processor-containing system, or any other system capable of executing or interpreting instructions. In the context of this document, a "computer-readable medium" is any means that can contain, store, communicate, propagate, or transport the program for use by or in connection with the instruction execution system, apparatus, or device.

Some embodiments of the computer-readable medium are, for example, among others, an electronic, solid-state, magnetic, optical, electromagnetic, infrared, or semiconductor system, apparatus, device, or propagation medium, either internal to DVR 102 or externally connected to the DVR 102 via one or more communication ports or network interfaces. More specific examples (a non-exhaustive list) of the computer-readable medium would include the following: an electrical connection (electronic) having one or more wires, a portable computer diskette (magnetic), a hard drive storage device (magnetic), a random access memory (RAM) (solid-state device), a read-only memory (ROM) (solid-state device), an erasable programmable read-only memory (EPROM or Flash memory) (multiple devices), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

As described in more detail below, DVR application 228 and/or other applications associated with DVR 102 can be used for facilitating the transfer of media content from a first digital media device to a second digital media device. For example, the first and second digital media devices could be, among other digital media devices, DVRs (i.e. DVR set-tops) configured according to the embodiment of DVR 102 depicted in FIG. 2. Such embodiments can be used to copy, or otherwise transfer, the media content of an internal storage device of a first media device to a second media device without loss of media content. Although the systems and methods described herein could be applied to any digital media device, several embodiments are described with respect to their application to DVRs. For example, such a situation arises when a cable television subscriber is upgrading to a newer or more fully featured DVR set top or replacing a defective DVR set-top, among other possible reasons. According to some embodiments, the second digital media device could even be a personal computer (PC) or a portable media device, among others.

Figure 3:
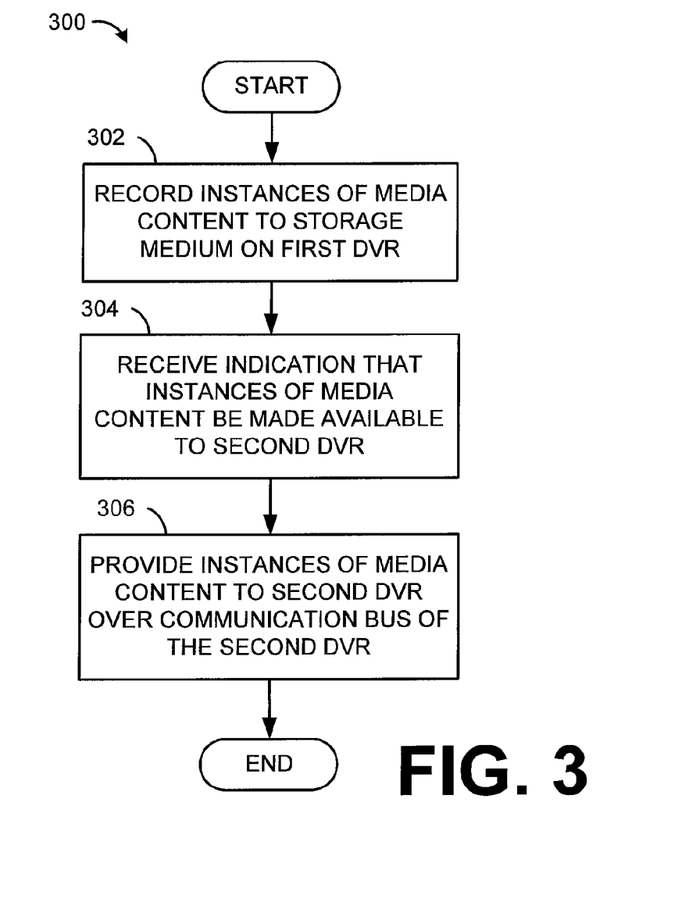
FIG. 3 depicts a flow diagram of an embodiment of a process for transferring media content from a first DVR to a second DVR, each of the first and second DVRs potentially configured as an embodiment of the exemplary DVR depicted in FIG. 2.

FIG. 3 depicts a flow diagram 300 of an embodiment of a process for transferring media content from a first DVR to a second DVR. In some cases, the first DVR may also be referred to herein as an original DVR and the second DVR may also be referred to herein as a replacement DVR.

At block 302, instances of media content are recorded to a first storage medium associated with the first DVR. For example, a user may select an episode of the television show Smallville for recording, the DVR receives the episode of Smallville from media signal source 104 and stores the episode as an instance of media content on internal storage 218. Over time, the user may store several instances of media content to internal storage 218. The first DVR may also store catalog information related to the media content stored to the storage medium. The catalog information may include information about associated media content, such as guide information (i.e., title, actors, genre, program description, channel, time, etc.), recording date, and/or trip play information. The catalog information may also include logical rules for determining which of the media data stored to the storage device can be deleted at a particular opportunity.

At block 304, depending on the specific embodiment, either the first or second DVR may receive an indication that instances of media content are to be made available to the second DVR. Exemplary embodiments of this step will be described in later portions of this document.

At block 306, the instances of media content recorded to the first storage medium are provided to a second DVR. For example, the instances of media content can be provided to the second DVR over its communication interface 222, which could be a high-speed communication bus.

Figure 4:
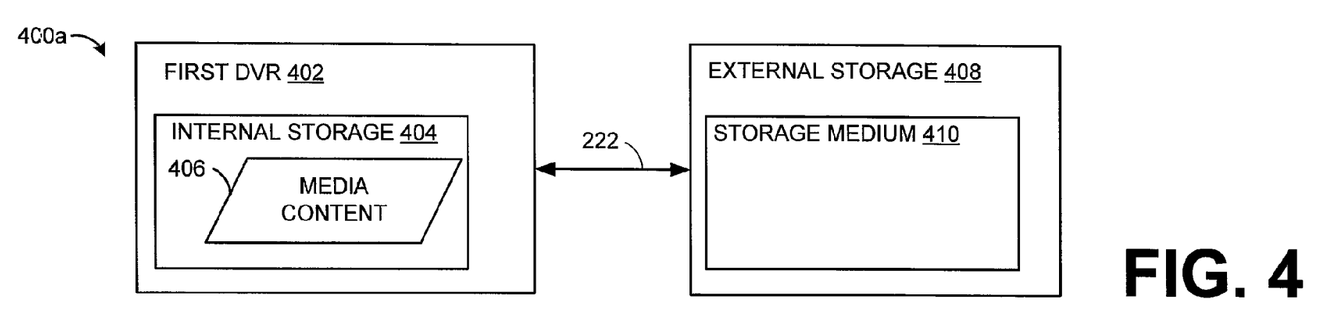
FIG. 4 depicts a simplified block diagram of a first DVR and associated external storage in a first stage of an exemplary media content transfer process.
Figure 5:
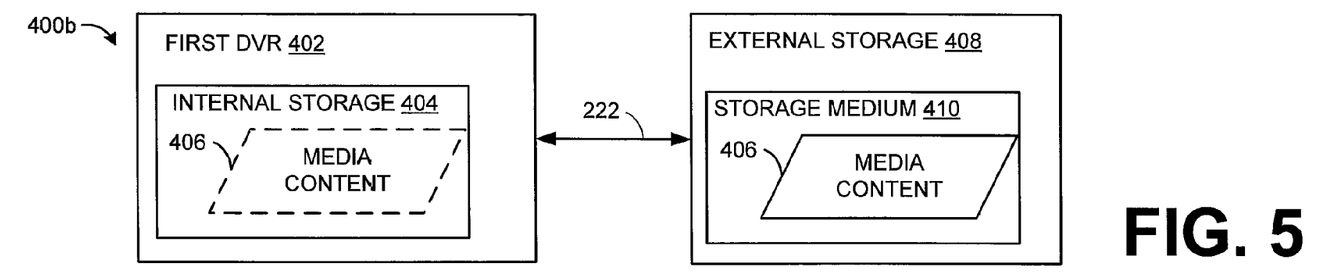
FIG. 5 depicts a flow diagram of the first DVR and external storage of FIG. 4 in a second exemplary stage of the exemplary media content transfer process.
Figure 6:
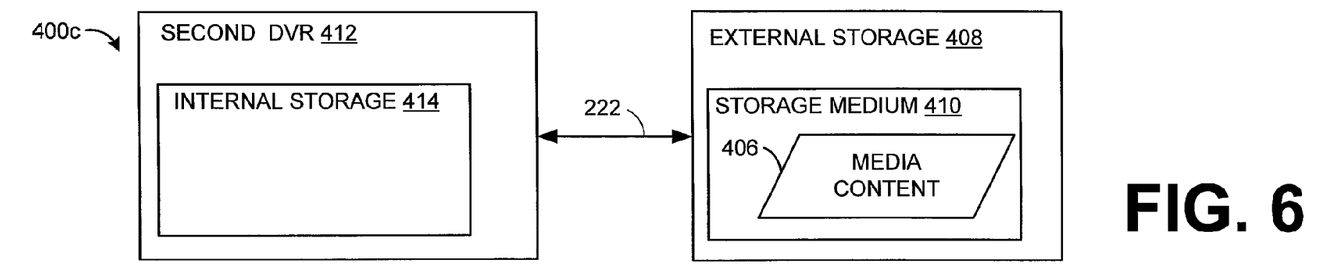
FIG. 6 depicts a simplified block diagram of a second DVR connected to the external storage of FIGS. 4 and 5 in a third stage of the exemplary media content transfer process.

Now that a general overview of the concepts of an embodiment of a media content transfer process have been described, FIGS. 4-6 depict the stages of a first exemplary embodiment of the media content transfer described with respect to the flow diagram of FIG. 3. The exemplary stages depicted in FIGS. 4-6 specifically provide a visual depiction of the various blocks of the flow diagram embodiment depicted in FIG. 7.

Specifically, FIG. 4 depicts a simplified block diagram 400a of a first stage of an embodiment of a media content transfer process. Specifically, a first DVR 402 includes internal storage 404, which could correspond to, for example, internal storage 218 of the DVR 102 of FIG. 2. Media content 406, which may comprise one or more instances of media content, is stored to a storage medium associated with internal storage 404. For example, the one or more instances of media content could comprise one or more episodes of a television show, such as Smallville. Internal storage 404 could also be used to store catalog information associated with the media content, among other information. As further depicted in FIG. 4, external storage 408 is placed in communication with first DVR 402 over a communication bus, depicted as communication interface 222. According to some embodiments, external storage 408 corresponds to the described external storage 220 of the DVR 102 of FIG. 2. Accordingly, external storage 408, in some embodiments, includes a storage medium 410 for reading and/or writing media content thereto. Storage medium 410 could also be used to store catalog information, among other information.

FIG. 5 depicts a simplified block diagram 400b of a second stage of the media content transfer embodiment described with respect to FIG. 4. Specifically, because external storage 408 is communicatively coupled to first DVR 402, the media content 406 stored to internal storage 404 can be transferred to the storage medium 410 of external storage 408. According to some embodiments, the media content 406, previously stored to internal storage 404, is deleted from internal storage 404. However, in some embodiments, media content 406 may remain stored to internal storage 404.

According to some embodiments, the media content 406 that is stored to internal storage and/or transferred to storage medium 410 could be encrypted by the first DVR. Embodiments directed to enabling such encrypted media content to be decrypted by other media devices, such as a second DVR, will be described in portions of the detailed description below.

FIG. 6 depicts a third stage of the media content transfer process depicted in FIGS. 4 and 5. Specifically, a second DVR 412 (which could be configured as the DVR 102 of FIG. 2) is placed in communication with external storage 408. For example, second DVR 412 can be communicatively coupled to external storage 408 through a communication interface 222, such as a high-speed communication bus. Once communicatively coupled to external storage 408 such that the storage medium 410 is accessible to read the media content 406 therefrom, second DVR 412 may access, or otherwise be provided with, the media content and/or other information (i.e. catalog information) stored to storage medium 410 as needed. According to some embodiments, the media content 406 and/or other information could be copied or otherwise transferred from storage medium 410 to the internal storage 414 of second DVR 412. However, in some embodiments, the second DVR 412 is capable of reading and using the media content 406 directly from storage medium 410 (i.e. for playback or other purposes) over the communication interface 222.

Figure 7:
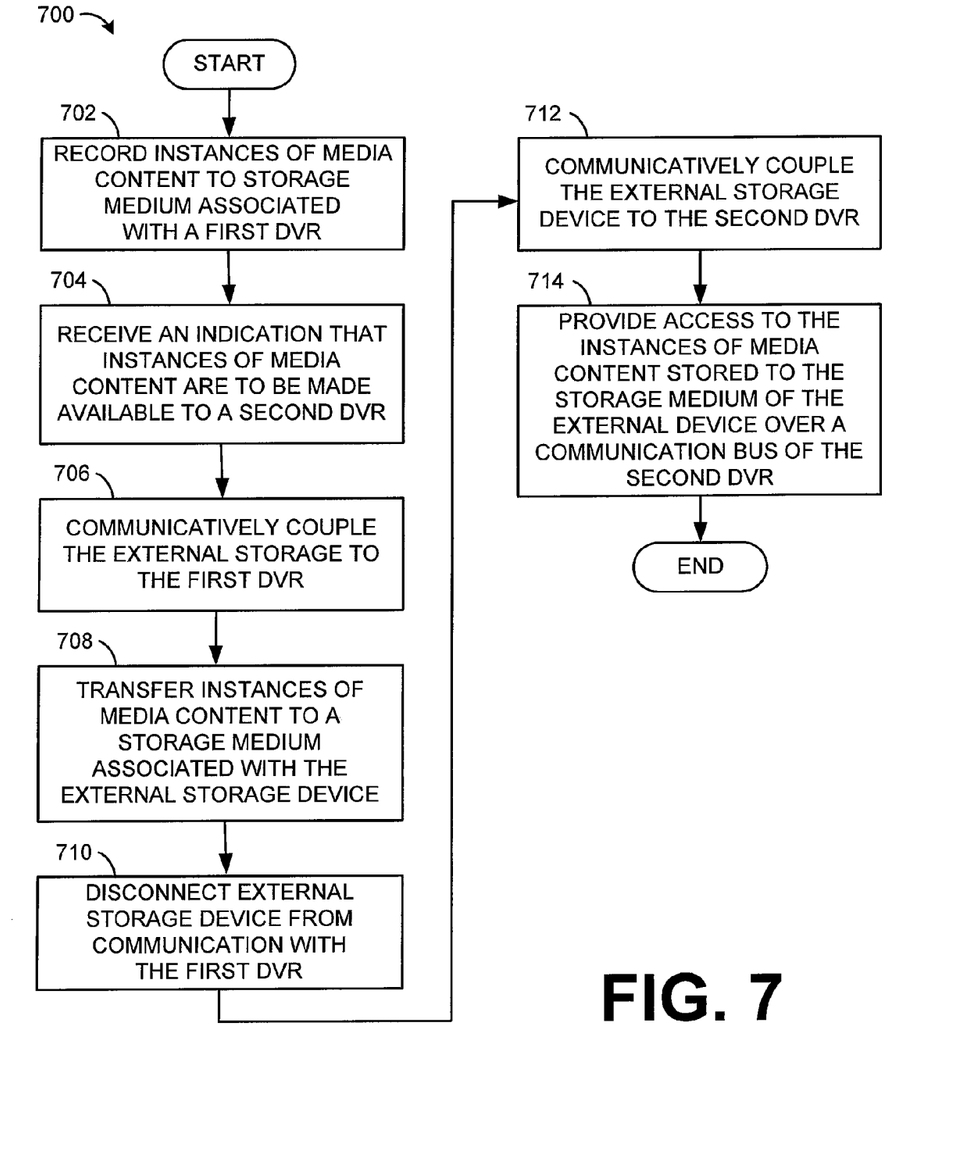
FIG. 7 depicts a flow diagram of an embodiment for carrying out the various stages of the media content transfer process of FIGS. 4-6.

FIG. 7 depicts a flow diagram describing an exemplary process for facilitating the media content transfer described with respect to FIGS. 4-6. At block 702, instances of media content are recorded to a storage medium associated with the first DVR 402. For example, the instances of media content can be received, potentially encoded if necessary, and stored to internal storage 404.

At block 704, first DVR 402 may receive an indication that the instances of media content recorded to the storage medium associated with the DVR 402 are to be made available to second DVR 412.

For example, according to some embodiments, the first DVR 402 may receive input from a user requesting that the instances of media content recorded to the storage medium associated with the DVR 402 be made available to second DVR 412. Such a user selection can be made, for example, through a remote control or other input device communicating to DVR 402 through input system 210 (FIG. 2). When first DVR 402 receives the user selection, this may trigger logic associated with DVR application 228 (executed in DVR 402) that guides the user through the process of allowing the media content to become available to the second DVR 412. The user interface may ask the user to, for example, attach the external storage 408 to the first DVR. Once the external storage 408 is connected, the process of transferring media content to the storage medium 410 on external storage 408 is initiated.

According to some embodiments, the indication that the instances of media content recorded to the storage medium associated with the first DVR 402 are to be made available to the second DVR 412 is an event triggered by the detection of a connection of the external storage 408 to the first DVR (i.e., as may be performed in block 706). That is, the attachment of external storage 408 to first DVR 402 can serve to automatically imply that the media content is to be copied from internal storage 404 to the storage medium 410 of external storage 408. Such an implication could also be conditional, based on whether the external storage includes files and/or logic, readable by the first DVR 402, that indicates that the storage is to be used for the purpose of transferring files.

According to yet another embodiment, the indication that the first DVR is to transfer media content to the external storage 408 could come from a remote server (i.e. from a cable-head end or other remote server in communication with the first DVR). Specifically, the remote server could send the indication, which could include instructions and/or other logic, for performing the transfer process. Such an indication could be transmitted to the first DVR 402 at the request of a user. According to one embodiment, the service-provider's customer service representative or automated system (i.e. telephone response system and/or Internet server), could initiate such an indication. Although such indications could be received by a DVR at the user premises, according to some embodiments, a service provider staging or unit swap-out area (i.e. at the service provider's facility) can be provided for such service.

According to some embodiments, providing a DVR with the ability to transfer media content can be used as an income stream by the service provider. For example, the service provider can charge extra to initiate, or otherwise facilitate, the media transfer process and/or charge to use their facility to do so. Such an income stream can be enabled, in part, because the indication that the first DVR is to transfer media content can be authorized and/or entitled under the control the service provider (i.e. an MSO, etc.). Whether the invocation of the transfer is performed by a remote server or by the user, according to some embodiments, the service provider can provide the authorization to perform the transfer.

At block 706, external storage 408 is communicatively coupled to the first DVR 402. For example, the external storage 408 can be connected to the external port of the first DVR that is associated with the communication interface 222. At block 708, the instances of media content are transferred to storage medium 410 associated with external storage 408. At block 710, the external storage 408 can be disassociated with first DVR. For example, the external storage 408 can be detached or otherwise removed from communication with the first DVR 402.

At block 712 external storage 408 can be communicatively coupled to the second DVR 412. For example, the external storage 408 can be attached to the external port of the second DVR 412 to provide communication over the communication interface 222. At block 714, according to some embodiments, access to the instances of media content stored to the second storage medium 410 of external storage 408 is provided to second DVR 412 over the communication interface 222 of the second DVR.

According to some embodiments, access to the media content may further include providing access to the media content using a key transfer scheme, transencryption scheme, password, remote authorization from a cable head end and/or other verification that ensures the media content is viewable by second DVR 412.

For example, according to some embodiments, access to the instances of media content 406 is provided to second DVR 412 using a key transfer scheme and/or a re-encryption process. For example, the instances of media content 406 may be initially encrypted by first DVR 402 using a content key for each instances of media content. According to some embodiments, these content keys are further encrypted by a secure element of the first DVR 402 with a second key and then stored to memory or non-volatile storage. Since the content keys are encrypted, other DVRs that do not have access to the second key are not able to decrypt the content keys in order to access the media content 406 for playback. Thus, if the instances of media content 406 are not useful for playback on second DVR 412 unless second DVR 412 is provided access.

Accordingly, in one embodiment, content keys can be provided from the first DVR 402 to the second DVR 412 by re-encrypting the content keys using an encryption key that is capable of being decrypted by the second DVR set top. For example, the first DVR 402 can be configured to decrypt the content keys associated with instances of media content stored to internal storage 404. The content keys associated with the instances of media content can then be encrypted by the first DVR 402 into encrypted content keys that are capable of being decrypted by the second DVR 412. For example, among other possibilities, the first DVR 402 could encrypt the content keys with a public key of a secure element of the second DVR 412. The encrypted content keys can then be transferred and stored to the second storage medium 410 associated with external storage 408. For example, when media content 406 is transferred to storage medium 410, the re-encrypted content keys can be transferred to storage medium 410 as well. Once external storage 408 is communicatively coupled to second DVR 412, the second DVR 412 accesses the re-encrypted content keys and decrypts them. For example, second DVR 412 can decrypt them with its private key, which could be stored securely within a secure element of second DVR 412. Accordingly, the content keys can then be accessed in order to decrypt the associated media content 406.

According to yet another example of providing access to the media content stored to the second storage medium 410, the encrypted content keys, as encrypted by first DVR 402, can be stored to storage medium 410 along with the instances of media content 406. A key capable of decrypting the encrypted content keys can then be provided to second DVR 412. Once the external storage 408 is placed in communication with second DVR 412, the second DVR 412 can decrypt the encrypted content keys associated with the media content using the key provided to second DVR 412. Finally, the media content 406 can be decrypted with the content keys to provide access to the media content stored to the second storage medium. One skilled in the art will understand that other keying and/or trans-encryption schemes, among other access methods, could be used to access the media content.

Figure 8:
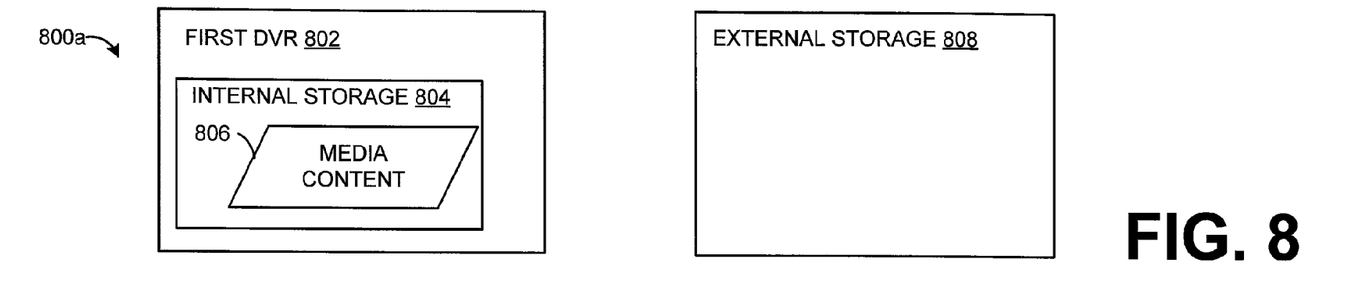
FIG. 8 depicts a simplified block diagram of an embodiment of a first DVR and external storage according to a first stage of an exemplary media content transfer process.

FIG. 8 depicts a simplified block diagram 800*a* of an embodiment of a first stage of another media content transfer process. According to such an embodiment, media content 806 is stored to an internal storage 804 of first DVR 802. External storage 808 provides an enclosure for receiving a storage medium, such as internal storage 804. According to some embodiments, internal storage 804 is an HDD or other storage device and/or storage medium which can be removed from first DVR 802 and installed into external storage 808.

Figure 9:
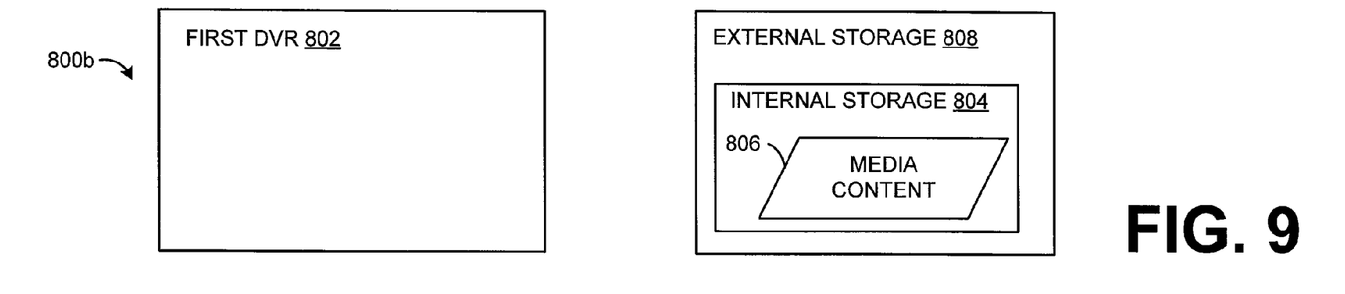
FIG. 9 depicts a simplified block diagram of the first DVR and the external storage of FIG. 8 in a second stage of the exemplary media content transfer process of FIG. 8.

FIG. 9 depicts a simplified block diagram 800*b* of a second stage of the media content transfer process of FIG. 8. Here, internal storage 804 has been removed and disconnected from the housing 219 (FIG. 2) of first DVR 802 and associated with external storage 808. Specifically, the storage medium of internal storage 804 can be installed within the housing of external storage 808, which could be a portable storage device equipped with a port and associated circuitry for communicating over a communication interface 222 (FIG. 2) associated with a DVR.

Figure 10:
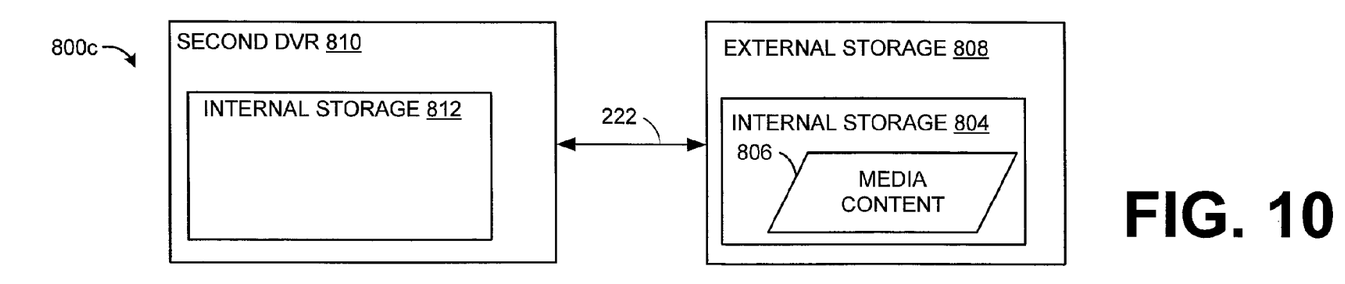
FIG. 10 depicts a simplified block diagram of a second DVR, as well as the external storage of FIGS. 8 and 9, in a third stage of the exemplary media content transfer process depicted in FIGS. 8 and 9.

FIG. 10 depicts a simplified block diagram 800*c* depicting a third stage of the exemplary media content transfer process of FIGS. 8 and 9. Specifically, external storage 808, now having internal storage 804 installed therein, is communicatively coupled to second DVR 810 over communication interface 222. Accordingly, in such an embodiment, the internal storage device of the first DVR 802 is removed from the housing of the first DVR, placed in association with an external storage 808, and then communicatively coupled to the second DVR 810 to provide access to the media content 806 stored to internal storage 804. The media content 806 can then be accessed for playback, or other operations, by second DVR 810. According to some embodiments, second DVR 810 can be configured to copy the media content 806 from internal storage 804 of external storage 808 to internal storage 812 of second DVR 810.

Figure 11:
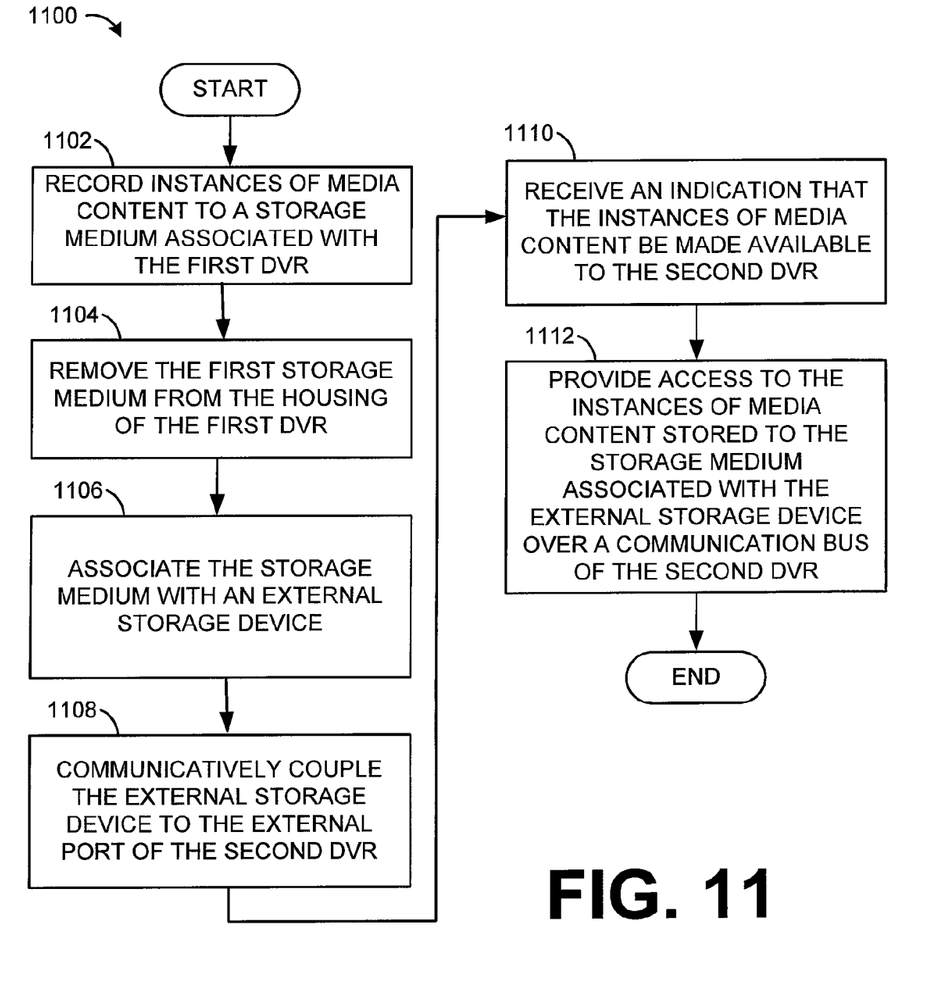
FIG. 11 depicts a flow diagram of an embodiment for carrying out the various stages of the media content transfer process as described with respect to FIGS. 8-10.

FIG. 11 depicts a flow diagram 1100 of an embodiment of the media content transfer stages described with respect to FIGS. 8-10. At block 1102, instances of media content 806 are stored to a storage medium associated with the first DVR 802. Specifically, according to one embodiment, media content 806 is stored to internal storage 804.

At block 1104, the first storage medium (i.e. internal storage 804) is removed from the housing of the first DVR 802. At block 1106 the first storage medium is associated with an external storage device, such as external storage 808. According to some embodiments, internal storage 804 is installed within the housing of external storage 808, for example.

At block 1108, the external storage 808 is communicatively coupled to the second DVR. Specifically, according to one embodiment, external storage 808 is coupled to an external port of second DVR 810 using communication interface 222.

At block 1110, an indication that the instances of media content are to be made available to the second DVR 810 is received. For example, a user selection can be received on the second DVR 810 (e.g through a graphical user interface) requesting that instances of media content be made available to the second DVR or an indication could be received from a remote server. In another embodiment, the attachment of external storage 808, containing a pre-formatted storage element containing the media content 806 causes the DVR 810 to automatically access the stored material. According to the latter embodiment, the process of making the first storage element available to the second DVR is initiated simply by attaching the external storage, and no specific user input is needed.

At block 1112, the second DVR 810 provides access to the instances of media content stored to the second storage medium over, in one embodiment, the communication bus 222 of the second DVR. According to some embodiments, such access is facilitated through using a key mechanism or trans-encryption scheme, among other possibilities, similar to that described above.

Figure 12:
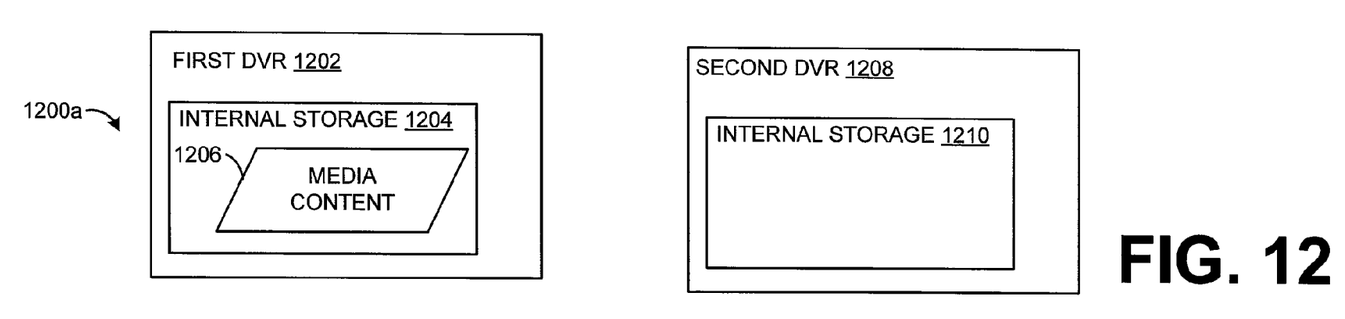
FIG. 12 depicts a simplified block diagram of a first DVR and a second DVR according to an embodiment of a first stage of an exemplary media content transfer process.

FIG. 12 depicts a simplified block diagram 1200a of another embodiment of a media content transfer process. Specifically, a first DVR 1202 has recorded media content 1206 stored to its internal storage 1204. A second DVR 1208, which includes its own internal storage 1210, is provided as the replacement set top.

Figure 13:
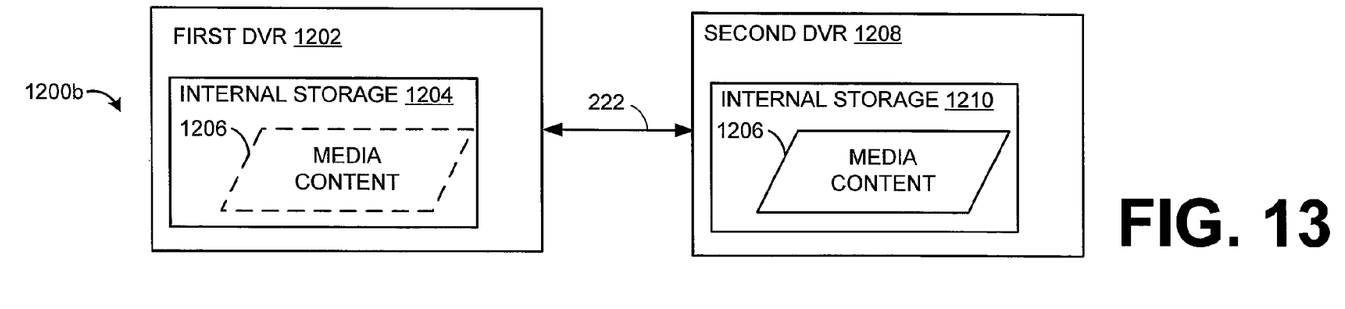
FIG. 13 depicts the first DVR and the second DVR in a second stage of the exemplary media content transfer process of FIG. 12.

FIG. 13 depicts a simplified block diagram 1200b of a second stage of the exemplary media content transfer process depicted in FIG. 12. Here, first DVR 1202 is communicatively coupled to second DVR 1208.

Specifically, according to one embodiment, first DVR 1202 is connected to second DVR 1208 over communication interface 222, which could be a high-speed communication bus. According to such an embodiment, the media content 1206 stored to internal storage 1204 can be transferred to internal storage 1210 of second DVR 1208 over communication interface 222.

Once the media content 1206 has been transferred to internal storage 1210, according to some embodiments, the media content 1206 is deleted from internal storage 1204. However, in other embodiments, media content 1206 can remain on internal storage 1204.

Figure 14:
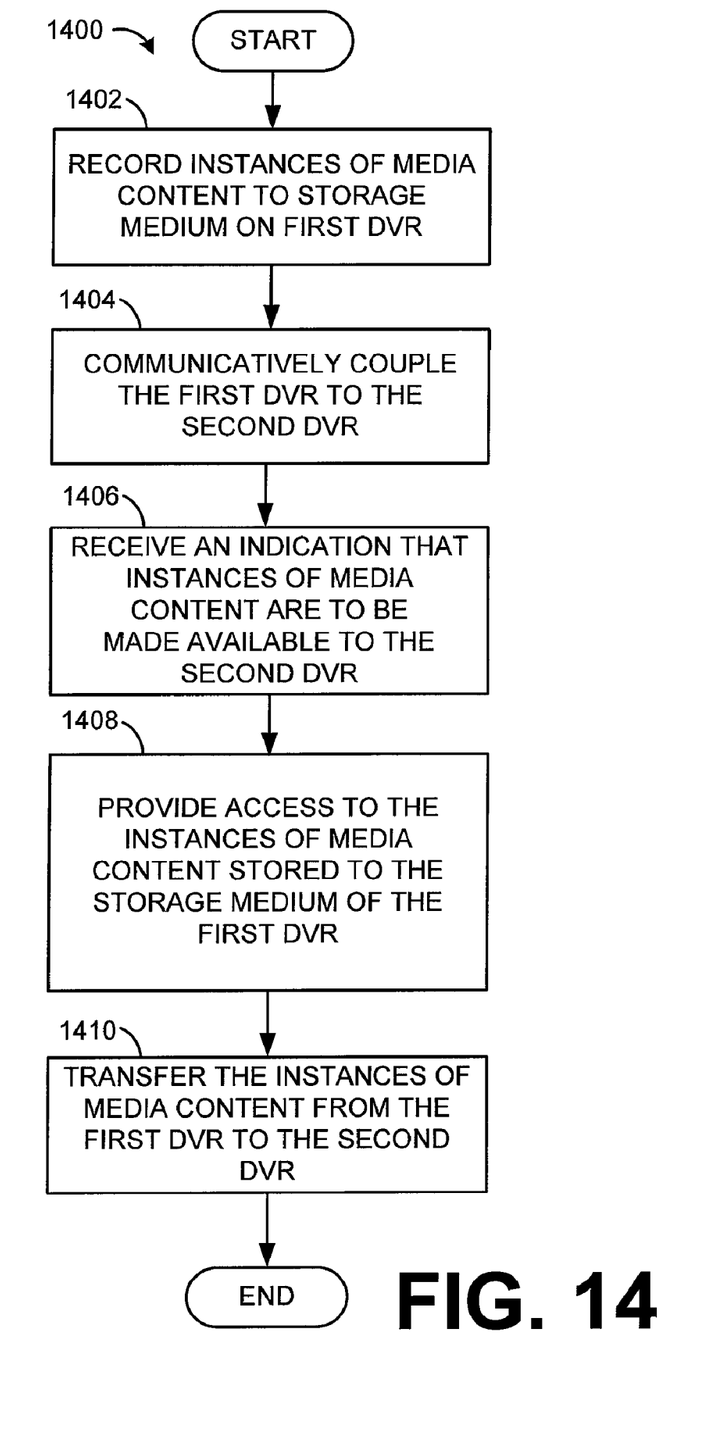
FIG. 14 depicts a flow diagram of an embodiment of a process for media content transfer that can be carried out in the manner described with respect to FIGS. 12 and 13.

FIG. 14 depicts a flow diagram 1400 of an exemplary process for media content transfer as described with respect to the media content transfer diagrams of FIGS. 12 and 13. Specifically, at block 1402, instances of media content are recorded to a storage medium associated with the first DVR 1202. For example, the media content 1206, in some embodiments, is stored to an internal storage 1204 of first DVR 1202. At block 1404, the first DVR 1202 is communicatively coupled to the second DVR 1208. Specifically, according to one embodiment, the first DVR is communicatively coupled to the second DVR through their respective external ports to communicate over communication interface 222.

At block 1406, an indication can be received at either the first DVR or the second DVR that requests instances of media content are to be made available to the second DVR.

For example, as described in embodiments above, such indication could be from a user through a graphical user interface or received by either DVR from a remote server. In some embodiments, the attachment of the first DVR 1202 to the second DVR 1208 triggers an event that provides the indication that the media content is to be made available to the second DVR. That is, the attachment of first DVR 1202 to second DVR 1208 can serve to automatically imply that the media content is to be copied from internal storage 1204 to internal storage 1210 of second DVR 1208.

At block 1408, access is provided to the instances of media content stored to internal storage 1204. According to some embodiments, such access is facilitated through using a key mechanism or trans-encryption scheme similar to that described above. At block 1410, the instances of media content 1206 and/or other information, can be transferred from the internal storage 1204 to the internal storage 1210 of the second DVR over the communication interface 222.

Conditional language, such as, among others, "can," "could," "might", or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, steps, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the preferred embodiments of the systems and methods described herein in which steps or functions may be deleted, executed out of order from that shown or discussed, including substantially concurrently or in reverse order, depending on the functionality involved, as would be understood by those reasonably skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

At least the following is claimed:

1. A method for transferring media content from a first digital video recorder (DVR) set-top to a second DVR set-top comprising:

recording instances of media content to a first storage medium located internal to a housing of the first DVR set-top;

storing a plurality of catalog data comprising at least one logical data management rule associated with each of the instances of media content, wherein the logical data management rule comprises a retention rule for determining which of the instances of media content can be deleted at a particular opportunity;

wherein the particular opportunity comprises an instant after the media content is transferred from the first DVR set-top to the external storage device, and after the particular opportunity, the media content is deleted from the first DVR set-top;

receiving an indication that the instances of media content stored to the first storage medium are to be made available for playback using the second DVR set-top, wherein the indication is triggered by the detection of a connection of an external storage device to the first DVR set-top;

removing the first storage medium from the housing of the first DVR set-top;

installing the first storage medium into the external storage device; communicatively coupling the external storage device to the external port of the second DVR set-top; and in response to receiving the indication that the instances of media content stored to the first storage medium are to be made available for playback using the second DVR set-top, transferring the instances of media content and the associated catalog data from the external storage device to the second DVR set-top over a communication interface of the second DVR set-top, the communication interface accessible from the external port of the second DVR set-top; and wherein the communication interface of the second DVR set-top is a high-speed communication bus; and wherein the indication that the instances of media content stored to the first storage medium are to be made available for playback using the second DVR set-top is received in response to a user selection via a graphical user interface; and wherein providing the media content stored to the second storage medium comprises providing access to the instances of media content using at least one of a keying scheme or a trans-encryption scheme; and wherein the media content is encrypted by the first DVR set-top using a control key for each instance of media content; and wherein the content key is encrypted by a secure element of the first DVR set-top with a second key; and wherein the content key is provided from the first DVR set-top to the second DVR set-top by re-encrypting the content key using an encryption key that is capable of being decrypted by the second DVR set-top.

2. A system for transferring media content, the system comprising:

a first digital video recorder (DVR) set top;

a second DVR set top coupled to the first DVR set top;

the first DVR set top configured to record instances of media content to a first storage medium located internal to a housing of the first DVR set-top, wherein the first storage medium is removable from the housing of the first DVR set-top and installable into an external storage device;

the first DVR set top configured to store a plurality of catalog data comprising at least one logical data management rule associated with each of the instances of media content, wherein the logical data management rule comprises a retention rule for determining which of the instances of media content can be deleted at a particular opportunity;

wherein the particular opportunity comprises an instant after the media content is transferred from the first DVR set-top to the external storage device, and after the particular opportunity, the media content is deleted from the first DVR set-top;

the first DVR set top configured to receive an indication that the instances of media content stored to the first storage medium are to be made available for playback using the second DVR set-top, wherein the indication is triggered by the detection of a connection of the external storage device to the first DVR set-top;

the second DVR set top configured to communicatively couple the external storage device having the first storage medium installed therein to an external port of the second DVR set-top; and the first DVR set top configured to, at a time after coupling the external storage device to the second DVR set-top and in response to receiving the indication that the instances of media content stored to the first storage medium are to be made available for playback using the second DVR set-top, provide the instances of media content and the associated catalog data from the first storage medium to the second DVR set-top over a communication interface of the second DVR set-top, the communication interface accessible from the external port of the second DVR set-top; and wherein the external storage device is configured to write to a second storage medium and the external storage device further comprising:

logic configured to transfer the instances of media content to the second storage medium by reading the media content from the first storage medium and writing the media content, using the external storage device, to the second storage medium; and logic configured to provide the instances of media content stored to the second storage medium over the communication interface of the second DVR set-top at a time after coupling the external storage device to the external port of the second DVR set-top;

wherein the communication interface of the second DVR set-top is a high-speed communication bus; and wherein the indication that the instances of media content stored to the first storage medium are to be made available for playback using the second DVR set-top is received in response to a user selection via a graphical user interface; and wherein providing the media content stored to the second storage medium comprises providing access to the instances of media content using at least one of a keying scheme or a trans-encryption scheme; and wherein the media content is encrypted by the first DVR set-top using a control key for each instance of media content; and wherein the content key is encrypted by a secure element of the first DVR set-top with a second key; and wherein the content key is provided from the first DVR set-top to the second DVR set-top by re-encrypting the content key using an encryption key that is capable of being decrypted by the second DVR set-top.

3. The method of claim 1, wherein recording instances of the media content further comprises recording the media content from two medial signal sources.

4. The method of claim 3, wherein the two medial signal sources are a CATV system and an over-the-air antenna.

5. The method of claim 1, wherein the indication that the instances of media content stored to the first storage medium are to be made available for playback using the second DVR set-top is a detection of the connection to the external storage device.

6. The method of claim 5, wherein the detection of the external storage device is conditioned upon the external storage device including files or logic readable by the first DVR indicating that the external device is to be used for transferring the media content.

7. The system of claim 2, wherein the detection of the connection of the external storage device to the first DVR set-top is conditioned upon the external storage device including files or logic readable by the first DVR indicating that the external device is to be used for transferring the media content.

8. The system of claim 2, wherein recording instances of media content to the first storage medium located internal to the housing of the first DVR set-top further comprises recording the media content from two medial signal sources.

9. The system of claim 8, wherein the two medial signal sources are a CATV system and an over-the-air antenna.

* * * * *